United States Patent [19]

Lask

[11] 4,366,137
[45] Dec. 28, 1982

[54] PROCESS FOR PRODUCING SILICON

[75] Inventor: Gert-Wilhelm Lask, Berus, Fed. Rep. of Germany

[73] Assignee: International Minerals & Chemical Luxembourg Societe Anonyme, Luxembourg, Luxembourg

[21] Appl. No.: 281,352

[22] Filed: Jul. 8, 1981

[30] Foreign Application Priority Data

Aug. 30, 1980 [DE] Fed. Rep. of Germany ....... 3032720

[51] Int. Cl.$^3$ .............................................. C01B 33/02
[52] U.S. Cl. .................................... 423/350; 423/345
[58] Field of Search ............................... 423/350, 345

[56] References Cited

U.S. PATENT DOCUMENTS 1,061,256 5/1913 Allen et al. .......................... 423/350
3,660,298 5/1972 McClury et al. ................ 423/350 X
4,247,528 1/1981 Dosaj et al. .......................... 423/350

FOREIGN PATENT DOCUMENTS 2008559 6/1979 United Kingdom ................ 423/350

Primary Examiner—G. O. Peters
Attorney, Agent, or Firm—Karl F. Ross

[57] ABSTRACT

A process for producing silicon in which a reaction mixture consisting, on the one hand, of hot-pressed briquettes of silicon dioxide (quartz) and carbon and, on the other hand, of granular quartz are introduced into an electric furnace and reacted so that silicon carbide is produced from the agglomerates and the silicon carbide then reacts with the quartz which fuses from the granular quartz to produce elemental silicon.

7 Claims, No Drawings

PROCESS FOR PRODUCING SILICON

CROSS REFERENCE TO RELATED APPLICATIONS

The present application is related to my copending applications Ser. No. 242,991 filed Mar. 12, 1981, Ser. No. 252,063 filed Apr. 8, 1981, and Ser. No. 275,159 filed June 19, 1981, entitled "Method of Producing an Intermediate in the Production of Silicon or Silicon Carbide".

FIELD OF THE INVENTION

The present invention relates to a method of producing elemental silicon and, more particularly, to the production of silicon from quartz and carbon in an electric furnace.

BACKGROUND OF THE INVENTION

The production of silicon from a mixture of silicon dioxide (generally quartz rock) and carbon can be carried out conventionally in an electric furnace with an overall reaction described by the equation $SiO_2 + 2C = Si + 2CO$. As can be seen from this equation two moles of carbon are required to react with a mole of silicon dioxide to yield one mole of silicon and two moles of carbon monoxide.

When silicon oxide and carbon are reacted in an electric furnace by conventional techniques, however, it is not always possible to ensure quantitative transformation of silicon dioxide to elemental silicon because silicon carbide may be produced by local reactions of the following form: $SiO_2 + 3C = SiC + 2CO$.

The electric furnaces which are used are mainly electrical low-shaft furnaces coming in metallurgical applications. As used herein, moreover, the term "quartz" will be employed to mean any silicon dioxide carrier capable of reacting with carbon to produce elemental silicon. Such raw materials include sand, quartzites and comminuted quartz rock.

When the above described reactions are carried out, as described, for example, at column 3, lines 4 through 19 of German Patent Document No. 20 55 564, a loose mixture and bed are formed from quartz and carbon without prior formation of agglomerates.

During the course of the reaction an intermediate in the form of silicon monoxide may be formed which undergoes disproportioning and hence the overall reaction involves cyclical reduction and reformation of silicon dioxide. This has been found to limit the yield and to be associated with increased energy consumption.

OBJECTS OF THE INVENTION

It is the principal object of the present invention to improve upon earlier methods of producing elemental silicon to avoid disadvantages such as those enumerated above and which may be brought out in greater detail subsequently.

Still another object of the invention is to improve the energy efficiency of an electric furnace method of producing elemental silicon from quartz and carbon.

Still another object of the invention is to provide a high efficiency process for the production of silicon which can utilize inexpensive and readily available raw materials.

SUMMARY OF THE INVENTION

These objects and others which will become apparent hereinafter are obtained, in accordance with the present invention, in a method which involves, within an electric furnace, locally transforming silicon dioxide in agglomerated (briquetted) state by reaction with carbon into silicon carbide in a first stage and thereafter reacting the silicon carbide with fused silicon dioxide to produce elemental silicon in a second stage so that the two steps of the reaction are essentially the following:

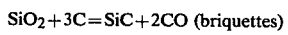

$SiO_2 + 3C = SiC + 2CO$ (briquettes)

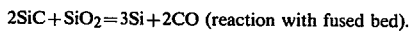

$2SiC + SiO_2 = 3Si + 2CO$ (reaction with fused bed).

While this process will be developed in greater detail below it is important to note that the reaction mixture charged in accordance with the invention into the electric furnace should consist of especially prepared briquettes of quartz and carbon, consitituting the agglomerate phase, and granular silicon dioxide which produces fused quartz while the silicon dioxide of the briquettes is reacting with the carbon to form silicon carbide so that the subsequent reaction stage can react the fused quartz with the silicon carbide to form silicon and carbon monoxide.

It should be noted that it is already known to form agglomerates of quartz and carbon, in the form of coal, by extrusion or other methods and that agglomerates of this type are known to lack stability when utilized in an electric furnace for reaction of the quartz with the carbon.

Such agglomerates manifest a pasty melting of the charge in certain regions of the electric furnace and alone are not capable of bringing about the quantitative transformation of silicon dioxide to silicon without significant formation of silicon carbide. In practice, therefore, the problems described above are present even when agglomerates of this type are used in the prior art and in part the difficulty can be traced to the formation of silicon monoxide and the generation of tacky products thereof.

With the system of the present invention, however, either the silicon monoxide is not formed or the detrimental effect of silicon monoxide is eliminated because, within the briquettes, the silicon dioxide appears to be quantitatively transformed to silicon carbide which, in turn, is quantitatively transformed to elemental silicon by the second reaction discussed above. The process of the invention, therefore, is a differential method with a highly controlled reaction differing in the agglomerates themselves and in the surrounding bed.

It is important, according to the invention, that the agglomerate phase be present as stable briquettes containing 30 to 60% by weight carbon, the balance silicon dioxide (quartz) with the briquettes being hot-briquetted from fine-grain quartz and fine-grain coal at a temperature of substantially 350° to 650° C., preferably 500° to 600° C.

According to another feature of the invention, the reaction during at least the first stage, and preferably during both stages in the electric furnace, is carried out at a temperature of at least 1600° C.

It has been found to be most advantageous to carry out the first stage at a minimum of 1600° C. and the second stage at a minimum of 1800° C., the preferred temperature range during the second stage being between 1800° and 2000° C.

According to yet another feature of the invention, the briquettes have individual weights of 10 to 100 g, preferably 20 to 60 g while the granular quartz which forms the bed together with the briquettes has a grain or particle size of 3 to 12 mm. The bed should have maximum-density packing, i.e. maximum-density spherical packing, hexagonal-closed packing or any similar packing with all the interstices between the briquettes being filled with the granular quartz.

Experience with the method of the invention has shown that the high local excess of carbon within the agglomerates practically includes the formation of silicon monoxide within the briquettes apparently because of the intimacy of contacts of the reactants. Apparently if any silicon monoxide is formed it reacts immediately with the carbon which is present and is decomposed to the silicon carbide.

The high specific gravity of the silicon carbide produced in the first stage of the reaction enables it to migrate deeply into the quartz melt formed by addition of the granular quartz so that its ability to react and the reaction rate between the silicon carbide and the fused quartz is increased.

SPECIFIC EXAMPLE

Substantially 432 kg of carbon in the form of fine-grain coal (particle size between substantially 0.05 and 1 mm) are briquetted with 666 kg of quartz sand having a particle size of 0.5 to 3 mm, thereby forming briquettes containing 39.3% by weight carbon and of a weight per briquette of 30 g. The briquettes are formed by a convention hot-briquetting furnace at a temperature of 550° C.

The briquettes are combined with 335 kg of quartz in a particle of 3 to 12 mm in the furnace and the resulting bed is heated to a temperature of 1650° C. for a period sufficient to fuse the quartz. It is observed, from the carbon monoxide evolution which results, that the silicon dioxide within the briquettes is substantially quantitatively transformed to silicon carbide.

The temperature of the furnace thereafter is raised to 1900° C., whereupon the further evolution of carbon monoxide signals the formation of elemental silicon.

Approximately 400 kg of elemental silicon are obtained.

It has been found to be advantageous to increase the carbon content of briquettes to an amount beyond that stoichiometrically required for the transformation of all of the silicon dioxide in the bed to silicon carbide.

Furthermore, the quartz in the bed should be in the form of granular quartz and the best results are obtained when one half of the granular quartz is in the form of quartz of grains of broken screen quartz size while the other half is in the form of sand or fine-quartz sand which can also be combined with carbon carriers if desired. Excellent results are obtained when 500 kg of sand or fine-quartz sand is briquetted with 432 kg of carbon so that the briquettes contain 46% by weight carbon.

The invention allows practically 50% of the quartz to be inexpensive river sand or fine quartzite which are not usable for other purposes. The power consumption can be reduced by 25 to 30% kg of silicon produced and hence the present method is a contribution to protection of the environment as well.

When caking coal is used as the carbon size, it should be employed in a proper proportion relative to its carbon content. For example, 25 units of caking coal can contribute 20 units of carbon ($\pm 3$) to the briquettes.

It has been found to be advantageous to use caking coal in an amount between 40 and 50% by weight of the carbon of the briquettes.

Other carbon carriers which improve the briquetting include petroleum coke and other cokelike materials with low impurity contents.

I claim:
1. A process for the production of silicon which comprises the steps of:
    (a) hot-pressing briquettes from fine-grain quartz and coal to produce briquettes containing substantially 30 to 60% by weight carbon, the balance being substantially silicon dioxide;
    (b) forming a bed of said briquettes and granular quartz in an electric furnace whereby the granular quartz fills interstices between said briquettes;
    (c) heating said bed in said furnace to fuse said granular quartz at a temperature of about 1600° C. to effect an internal reaction between the quartz and carbon of the briquettes to transform the silicon dioxide of said briquettes to silicon carbide; and
    (d) thereafter reacting said silicon carbide with the fused quartz to produce silicon and carbon monoxide at a temperature between 1800° C. and 2000° C.
2. The process defined in claim 1 wherein fine-grain quartz and coal are briquetted in step (a) at a temperature of substantially 350° to 650° C.
3. The process defined in claim 2 wherein the briquettes are formed at a temperature of substantially 500° to 600° C.
4. The process defined in claim 1 wherein the briquettes formed in step (a) have a weight between 10 and 100 g each.
5. The process defined in claim 4 wherein said briquettes have a weight of substantially 20 to 60 g each.
6. The process defined in claim 5 wherein said granular quartz has a grain size of substantially 3 to 12 mm.
7. The process defined in claim 6 wherein said bed is formed with a maximum-density spherical packing.

* * * * *